United States Patent [19]
Erdman

[11] 3,901,003
[45] Aug. 26, 1975

[54] ROTARY MOWER DECK STRUCTURE INCLUDING A SOUND- AND VIBRATION-ISOLATED BLADE HOUSING SECTION

[75] Inventor: Leon Paul Erdman, Beaverdam, Wis.

[73] Assignee: Deere & Company, Moline, Ill.

[22] Filed: Dec. 10, 1973

[21] Appl. No.: 423,058

[52] U.S. Cl. .................. 56/12.6; 56/15.9; 56/320.1
[51] Int. Cl.[2] .......................................... A01D 35/26
[58] Field of Search ....................... 56/6, 13.5–13.7, 56/15.2, 15.7–15.9, 320.1, 320.2, 255, 12.6

[56] References Cited
UNITED STATES PATENTS
3,056,249 10/1962 Shaw.................................... 56/12.6
3,483,684 12/1969 Price.................................... 56/13.6

Primary Examiner—J. N. Eskovitz

[57] ABSTRACT

A mower attachment for a tractor includes a deck structure which is formed in two separate sections, the first section being a blade housing section having a substantially horizontal top wall integral with a depending peripheral skirt and having a centrally located opening therein and the second section being a drive housing section disposed in blocking relationship to the opening located in the blade housing section and including a generally horizontal flange overlapping the top wall of the blade housing about the periphery of the opening. A plurality of fasteners extend through the flange and the top wall and include intermediate resilient rubber-like portions that are sandwiched between the flange and the top wall of the blade housing section for dampening vibration and noise. Every drive element that is mounted on the deck structure is mounted on the drive housing section along with the ground-engaging support means of the mower deck structure.

6 Claims, 3 Drawing Figures

ROTARY MOWER DECK STRUCTURE INCLUDING A SOUND- AND VIBRATION-ISOLATED BLADE HOUSING SECTION

BACKGROUND OF THE INVENTION

The present invention relates to a mower deck structure and more particularly relates to a deck structure wherein the mower blades and certain drive elements are mounted on a drive housing section of the structure, the drive housing section being mounted on a blade housing section of the structure through means isolating the blade housing section from sound and noise generated by the blade and drive elements carried by the drive housing section.

Conventional deck structures for rotary mowers are normally fabricated or stamped into a unitary rigid structure which supports the rotary mower blades and drive elements. Consequently, noise and vibrations generated by the blades and their drive elements are transmitted throughout the housing. Further, in the case of stamped deck structures, the gauge of steel used in making the latter are determined by the strength required for supporting the mower blades and their driving elements thereon, thus, resulting in deck structures which are overly heavy and expensive.

SUMMARY OF THE INVENTION

According to the present invention, there is provided a novel rotary mower deck structure constructed so as to confine noises and vibrations caused by the operation of the rotary blades and their drive elements to a central portion of the deck structure to which they are mounted.

Thus, a main object of the invention is to provide a rotary mower deck structure comprising a drive housing section to which the mower blades and all mower-carried drive elements are attached, and a blade housing section surrounding and attached to the drive housing section through means including rubber isolators situated between the drive housing section and the blade housing section so as to stop the transmission of noise and vibration between the two sections.

A further object is to provide a rotary mower deck structure, as thus described, wherein the draft linkages and lift mechanisms interconnecting the deck structure with a mobile vehicle are also attached to the drive housing section.

Still another object is to provide a deck structure, as above described, wherein the drive housing section is made of a relatively heavy-gauge steel and wherein the blade housing section is made of a substantially lighter-gauge steel than that used in making the drive housing section.

These and other objects will become apparent from the presented drawings and the ensuing description.

DESCRIPTION OF THE PREFERRED EMBODIMENT

Figure 1:
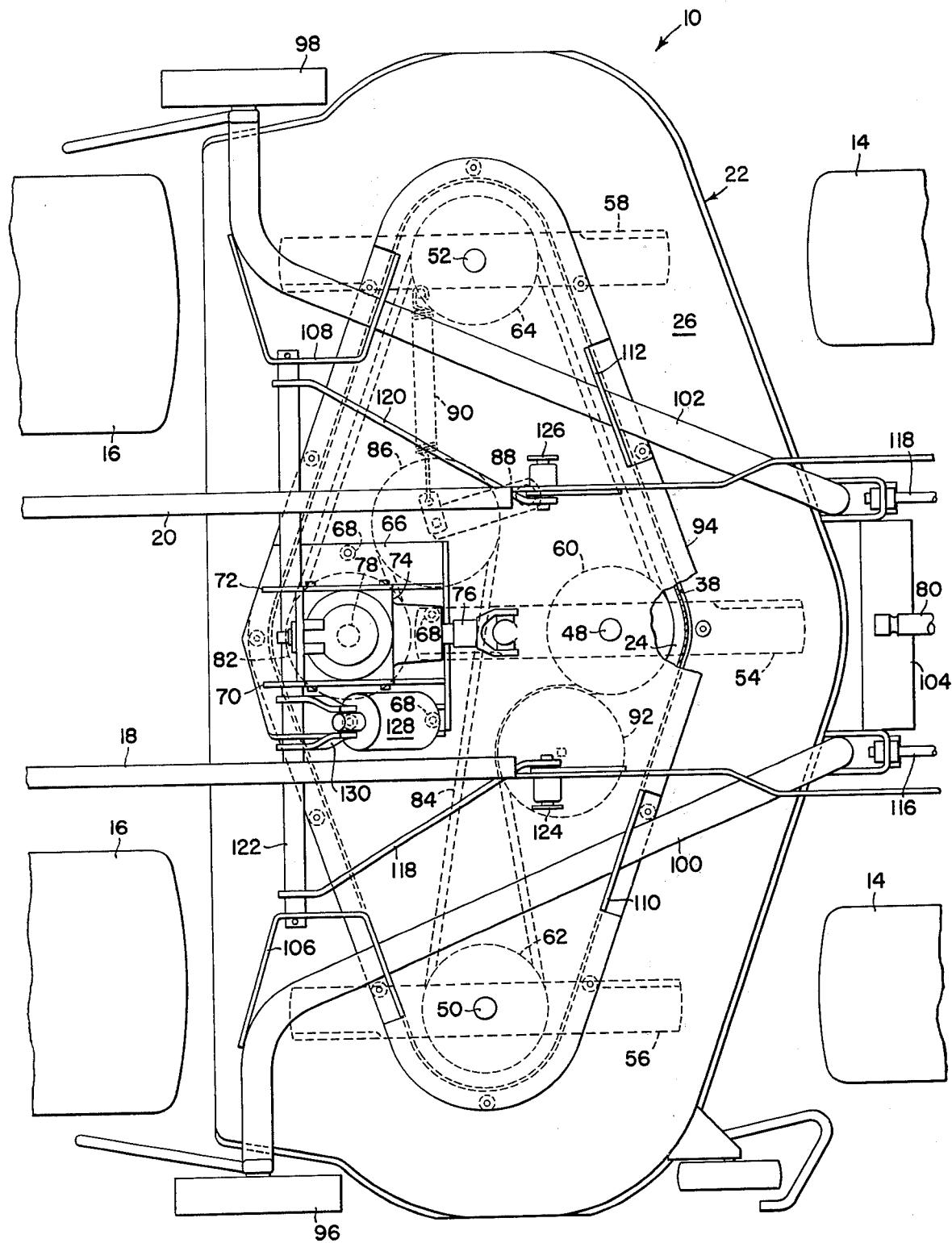
FIG. 1 is a top plan view of a rotary mower deck structure showing its relationship to front and rear pairs of wheels of a mobile vehicle and with parts being broken away.
Figures 2, 3:
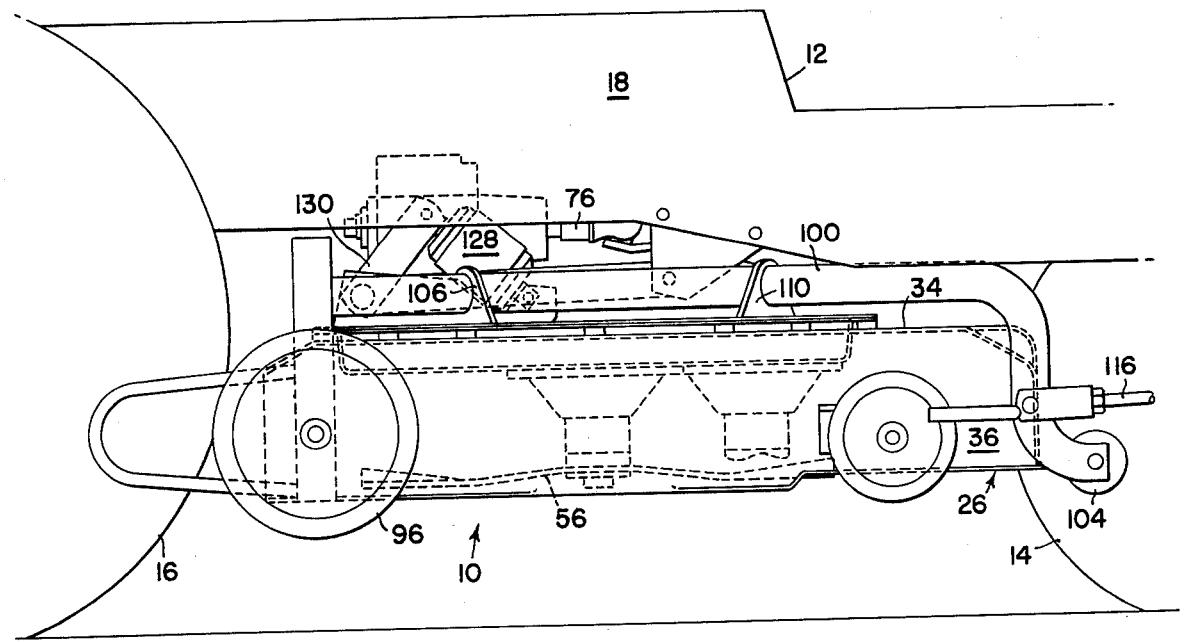
FIG. 2 is a right side elevational view of the mower deck structure and mobile vehicle portion shown in FIG. 1.
FIG. 3 is a sectional view showing the manner in which the drive and blade housing sections are interconnected and vibration-and noise-isolated to and from each other.

Referring now to the drawings, therein is shown a rotary mower indicated in its entirety by the reference numeral 10. The mower 10 is belly-mounted on a tractor 12 and thus is positioned between front and rear pairs of tractor wheels 14 and 16, respectively, which are interconnected by a fore-and-aft extending tractor frame having transversely spaced generally upright right and left side parts 18 and 20, respectively, as considered by one standing behind and facing the rear end of the tractor 12.

The mower 10 includes a deck structure 22 comprising a central drive housing section 24 surrounded by a blade housing section 26. The drive housing section 24 is a dish-like stamping including a bottom wall 28 and an upright sidewall 30 which terminates in a substantially horizontal flange 32. As viewed from the top, as in FIG. 1, the drive housing section 24 is in the shape of an oblong diamond disposed symmetrically relative to the fore-and-aft center line of the tractor and elongated transversely to the normal direction of travel of the tractor. The blade housing section 26 comprises a substantially horizontal top wall 34 from which depends a skirt 36. Located centrally in the top 34 is an opening 38 which is shaped complementary to and has the drive housing 24 disposed loosely therein with the peripheral flange 32 overlying that portion of the top wall 34 which borders the opening 38. Spaced at regular intervals in the flange 32 are a plurality of vertical holes which are respectively aligned with corresponding holes in the top wall 34 of the blade housing section. Respectively associated with each pair of aligned holes is a fastener comprising an intermediate resilient rubber-like portion 40 to which is bonded oppositely projecting threaded stud-like portions 41 and 42 that are respectively received in the holes in the flange 32 and the top wall 34, the portion 40 thus being disposed between the flange 32 and the top wall 34 so as to dampen and prevent vibrations or sound waves from being transmitted between the drive housing section 24 and the blade housing section 26.

While the present invention is not to be considered to be limited to the type of mower illustrated, the mower illustrated is of a three-blade type including three spindles 48, 50 and 52 extending vertically through and being rotatably mounted in the bottom wall 28 of the drive housing section 24 adjacent the front, right and left corners of the drive housing section 24. Respectively fixed to the bottom ends of the spindles 48, 50 and 52 are cutting blades 54, 56 and 58 and respectively fixed to the top ends of the spindles are drive sheaves 60, 62 and 64. Secured adjacent the rear corner of the bottom wall 28 of the drive housing section 24 is a generally horizontal mounting bracket plate 66 which is held in a fixed elevated position in the plane containing the flange 32 through means of a plurality of bolt and spacer means 68. Extending upwardly from the mounting bracket plate 66 are laterally spaced right and left vertical plates 70 and 72, respectively. A gearbox 74 is positioned between and secured to the plates 70 and 72 through means of appropriate fasteners. The gearbox 74 is of a conventional type including gearing connecting a generally horizontally extending input drive shaft 76 with a vertically extending driven shaft 78. Conventional shafting (not shown) provide a drive connection between input shaft 76 and a tractor power take-off shaft shown partially at 80. Secured to the bottom of the driven shaft 78 so as to be in plane of the driven sheaves 60, 62 and 64 is a driven sheave 82. A drive belt 84 is trained about these driven sheaves and is properly tensioned and oriented by means of a first idler sheave 86 which is connected to the drive housing section 24 through means of a pivoted idler arm 88 and engages that section of the drive belt extending between the rear driven sheave 82 and the right driven sheave 62. A tension spring 90 is connected between the idler arm 88 and the drive housing section 24 so as to bias the idler sheave 86 against the belt. That belt section which extends between the front driven sheave 60 and the right driven sheave 62 is trained about one side of an idler sheave 92 which is rotatably mounted on the drive housing section 24. A drive cover plate 94 has a marginal edge portion which overlies the flange 32 of the drive housing section 24 and is held in place by respective nuts threaded on the stud-like portions 41 of the fastener. The rear side of the cover plate 94 is cut out to receive the mounting bracket plate 66. A strip of flexible material (not shown) may be inserted between the edges of the cut-out portion and the plate 66 so as to prevent material from passing into the dish-like drive housing section 24.

For the purpose of supporting the deck structure on the ground during mowing operation, there is provided right and left rear ground-engaging wheels 96 and 98 which are respectively rotatably mounted on outwardly and oppositely projecting distal ends of right and left tubular support members 100 and 102, respectively, which are arched over the deck structure and converge towards each other and terminate at spaced apart down-turned ends having an elongate roller 104 extending therebetween and rotatably mounted therein. The right and left support members 100 and 102 are respectively fixed to the drive housing section 24 through means of right and left rear brackets 106 and 108 and right and left front brackets 110 and 112. The rear brackets 106 and 108 are in the form of generally U-shaped plates an are disposed and oriented such that they lie on one of their edges and open oppositely towards the right- and left-hand sides, respectively, of the mower. The bottom edge of one of the legs of each of the brackets 106 and 108 is welded to the drive housing sections 24 at the juncture of the side 30 and the flange 32. The forwardly converging portions of the tubular support members 100 and 102 respectively extend through openings provided in and are welded in place in the legs of the rear brackets that are secured to the housing 24. The remaining legs of the brackets 106 and 108 are respectively welded to the outwardly turned portions of the right and left support members 100 and 102, respectively. The right and left front brackets 110 and 112 are in the form of plates and have one of their edges welded to the drive housing section 24 at the juncture of the side 30 and the flange 32. Thus, the brackets 110 and 112 are connected to the drive housing section in a manner similar to the rear pair of brackets 106 and 108. The converging portions of the tubular support members 100 and 102 respectively pass through and are welded in place in the right and left front brackets 110 and 112. Thus it will be appreciated that the ground-engaging wheels 96 and 98 and the ground-engaging roller 104 are connected to the deck structure 22 only through means which are secured solely to the drive housing section 24.

For the purpose of connecting the deck structure 22 to the tractor 12, there is provided right and left front links 116 and 118, respectively, having rear ends respectively pivotally connected to the down-turned forward ends of the support members 100 and 102 and having their front ends pivotally connected in the vicinity of the front axle (not shown) of the tractor. Right and left rear links 118 and 120, respectively, have their rear ends fixed to a horizontal transverse rockshaft 122 which is journaled for rotation in the vertical plates 70 and 72 and in the rear brackets 106 and 108. The forward ends of the rear links 118 and 120 are respectively pivotally secured to the right and left sides 18 and 20 of the tractor frame through means of right and left pins 124 and 126. Power means in the form of an extensible and retractable hydraulic motor 128 is provided for actuating the deck structure between transport and mowing positions and for this purpose has its head end connected to mounting ears projecting upwardly from the mounting bracket plate 66 and has its rod end pivotally connected to the outer end of a crank arm 130 which is fixed to the rockshaft 122. Thus, it will be appreciated that extension of the hydraulic motor 128 will result in the lowering of the deck structure 22 while retraction of the hydraulic motor 128 will cause the deck structure to be raised.

During operation, noises and vibrations generated by the operation of the ground-engaging wheels 96 and 98 and the ground-engaging roller 104, as a result of operating over rough terrain, or noises and vibrations generated through the operation of the drive elements for driving the cutting blades of the mower will be transmitted no further than the drive housing section 24 due to the action of the resilient fastener portions 40 which act to dampen the vibrations and thus prevent their transmittal to the blade housing section 26.

Further, since the drive housing section 24 and the blade housing section 26 are made as separate members and that the drive element and the ground-supporting elements are all secured only to the drive housing section 24, the blade housing section 26 can be made of a much lighter gauge of metal than the gauge of metal used in forming the drive housing section 24.

I claim:

1. In a rotary mower of the type including a mower blade housing having a top supporting at least one rotatably mounted blade and drive means for said blade and having lift and draft linkage means connected thereto and adapted to be connected to a mobile vehicle, the improvement comprising: said housing top including a detachable section to which said blade, drive means and lift and draft linkage means are solely connected; and said detachable section being interconnected with the remainder of the top solely through fastener means including noise and vibration dampener means interposed between said detachable section and the remainder of the top.

2. The mower attachment defined in claim 4 wherein said draft and lift means includes first and second laterally spaced support members arched generally from front to rear over said mower blade housing and connected to the component supporting section through front and rear bracket means; and ground-engaging support means being mounted on forward and rearward end portions of said first and second support members.

3. The mower attachment defined in claim 2 wherein said draft and lift means also includes a rockshaft journaled in said rear bracket means; and a lift actuator connected between said rockshaft and said component supporting section of said mower blade housing.

4. A rotary mower attachment comprising: a mower blade housing having a top including a component supporting section interconnected with the remainder of the housing solely through fastener means including noise and vibration dampener means interposed between said component supporting section and the remainder of the blade housing; blade drive means being supported solely by said component supporting section; rotatably mounted blade means including at least one blade being rotatably mounted in said component supporting section and connected for being driven by said blade drive means; and draft and lift means being connected exclusively to said component supporting section of said blade housing and being adapted for connection to a mobile vehicle.

5. The mower attachment defined in claim 4 wherein said component supporting section is oblong-diamond shaped in top plan view with the long dimension extending transversely to the normal direction of travel of the mower; said blade drive means further including a gearbox mounted adjacent a rearmost corner of said component supporting section; and said rotatably mounted blade means including three vertically disposed blade-carrying spindles respectively positioned at front and opposite transverse end corners of said component supporting section.

6. The mower attachment defined in claim 4 wherein said component supporting section includes a main dish-like support member having a horizontal flange forming the periphery thereof and overlapping a top surface portion of said remainder of the blade housing.

* * * * *